United States Patent

Stojic et al.

Patent Number: 6,029,447
Date of Patent: Feb. 29, 2000

[54] SPRING BRAKE ACTUATOR WITH FILTERED VENT OPENINGS

[76] Inventors: Steven M. Stojic, 326 N. 145th Ave., Holland, Mich. 49424; Daniel Greenzweig, 667 Lake Forest La., Muskegon, Mich. 49441

[21] Appl. No.: 08/922,840

[22] Filed: Aug. 26, 1997

Related U.S. Application Data

[63] Continuation of application No. PCT/US95/02151, Feb. 21, 1995.

[51] Int. Cl.7 .............................. F16D 31/02; F15B 21/04
[52] U.S. Cl. ..................................... 60/453; 92/63; 92/79
[58] Field of Search .................................. 60/453; 91/63, 91/78, 79

[56] References Cited

U.S. PATENT DOCUMENTS

| | | |
|---|---|---|
| 1,615,370 | 1/1927 | Farmer ......................................... 92/78 |
| 2,177,767 | 10/1939 | Campbell .................................... 92/78 |
| 3,613,515 | 10/1971 | Swander et al. . |
| 3,842,716 | 10/1974 | Swander . |
| 3,896,706 | 7/1975 | Newstead et al. . |
| 3,977,308 | 8/1976 | Swander et al. . |
| 4,116,114 | 9/1978 | Swander et al. . |
| 4,480,530 | 11/1984 | Holmes . |
| 5,016,523 | 5/1991 | Bowyer . |
| 5,116,650 | 5/1992 | Bowser . |
| 5,193,432 | 3/1993 | Smith . |
| 5,377,579 | 1/1995 | Pierce . |
| 5,722,311 | 3/1998 | Pierce et al. . |
| 5,873,297 | 2/1999 | Stojic . |

FOREIGN PATENT DOCUMENTS

| | | |
|---|---|---|
| 0098029 | 1/1984 | European Pat. Off. . |
| 2208484 | 6/1974 | France . |
| 2279977 | 2/1976 | France . |
| 2384164 | 10/1978 | France . |
| 2521651 | 8/1983 | France . |
| 52-185 | 1/1977 | Japan . |
| 58-97550 | 6/1983 | Japan . |
| 60-30868 | 3/1985 | Japan . |
| 3-75069 | 7/1991 | Japan . |

*Primary Examiner*—F. Daniel Lopez
*Attorney, Agent, or Firm*—Rader, Fishman, Grauer & McGarry, an office of Rader, Fishman & Grauer, PLLC

[57] ABSTRACT

A spring brake actuator (10), with a large-force compression spring (72) in a spring chamber (101) of the housing, has vent openings (102) in the housing communicating with the spring chamber (101). A gas permeable filter element (104) covers the vent openings (102), and a filter frame assembly (106) is disposed over the filter element. The filter frame assembly (106) defines tortuous air passages from the filter element (104) to atmosphere so that air entering the spring chamber from atmosphere will be substantially free of contaminants.

37 Claims, 4 Drawing Sheets

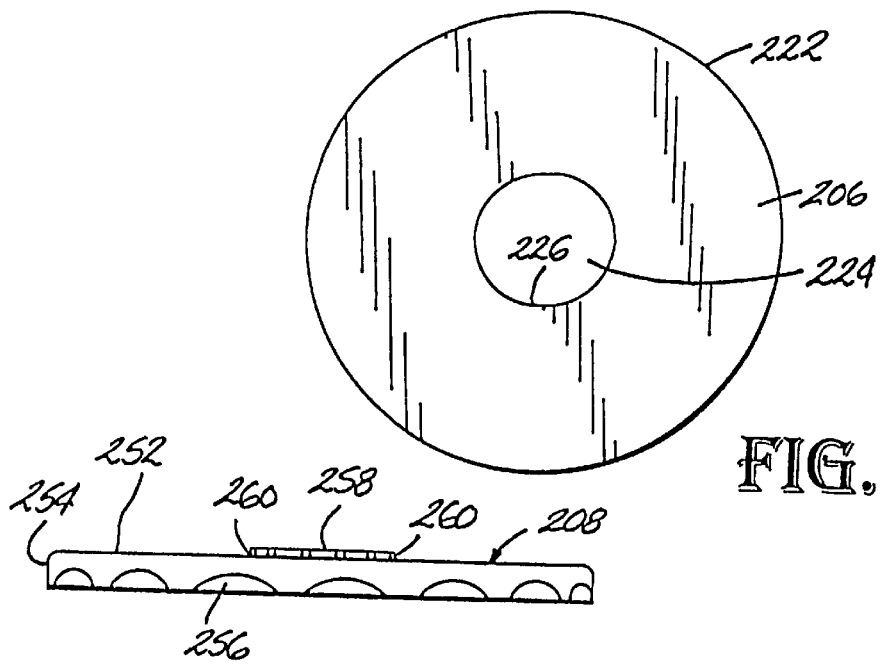
FIG. 6
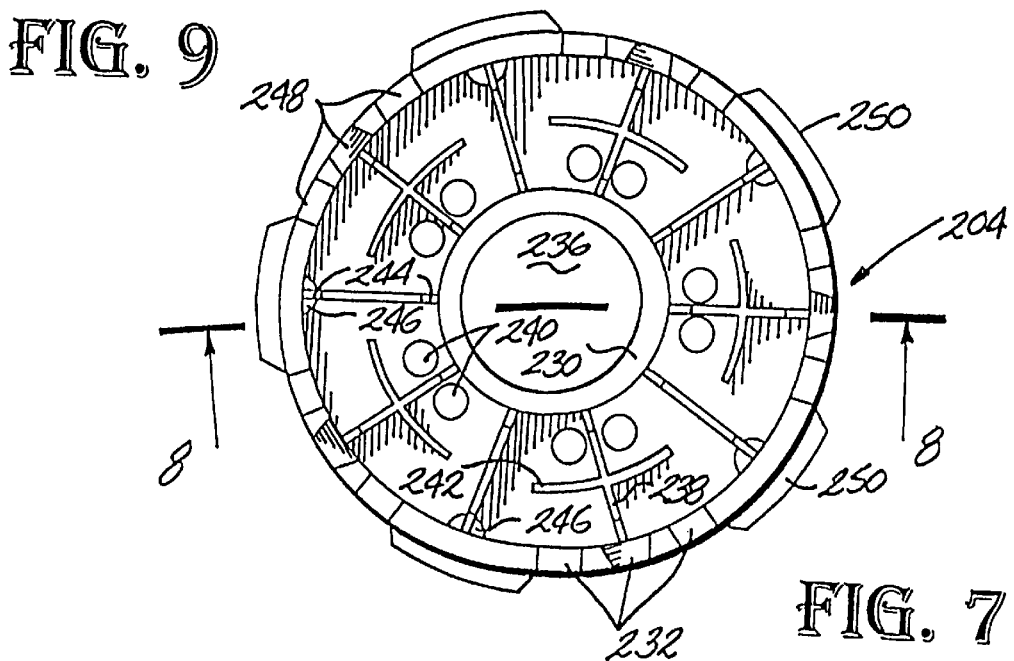
FIG. 9
FIG. 7
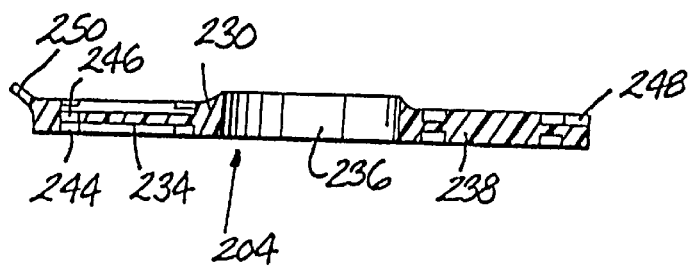
FIG. 8

SPRING BRAKE ACTUATOR WITH FILTERED VENT OPENINGS

RELATED APPLICATIONS

This application is a continuation of International Application No. PCT/US95/02151, filed Feb. 21, 1995.

BACKGROUND OF THE INVENTION

1. Field of the Invention

The invention relates to air-operated diaphragm brakes for vehicles and particularly to combination service and spring brake actuator assemblies.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. An actuating rod extends through the spring brake diaphragm to integrally connect with the pressure plate. In operation, it is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

The spring chamber on the spring side of the spring brake diaphragm is typically vented to the outside atmosphere to allow air to be exhausted from that portion of the housing when the diaphragm is actuated in the direction of the spring to compress the spring brake compression spring in the spring chamber. When the spring expands, the diaphragm is moved in a direction so as to enlarge the spring chamber and outside air is drawn into the spring chamber. Since the spring chamber is vented to the outside atmosphere under the truck chassis, the outside air drawn into the spring chamber is often accompanied by moisture and corrosive substances, such as road salt. Because the spring wears as it cycles and its bare metal becomes exposed as a result, the spring tends to corrode due to contaminants in the air. Also, because the spring brake compression spring must exert substantial force in order to act as an emergency brake, the spring is under great stress when it is compressed. The spring's durability is inversely proportional to the amount of corrosion and stress it experiences. In sealed housings, the spring cannot be removed from the housing without permanently deforming the housing. In other housings, the actuator must be replaced by a new actuator and the old actuator sent to a rebuilder. In any case, the actuator is not serviceable by the truck operator. Thus, when the spring brake compression spring breaks, the entire brake actuating unit must be replaced at substantial cost.

Attempts have been made to seal the spring chamber, including the provision of breather tubes to direct air from the spring chamber to other portions of the brake actuator and internal check valves to provide a one-way flow of air from the interior of the brake actuator to atmosphere. The prior art solutions to the problem of contaminated air entering the spring chamber have proven to be unworkable or costly and complicated to manufacture.

SUMMARY OF THE INVENTION

A spring brake actuator according to the present invention addresses the problem of contaminated air in the spring chamber by providing a filter element in the nature of a polymer membrane over vent openings in the housing wall. When the compression spring is expanded to actuate the brake, contaminated atmospheric air is drawn through the filter and the vent openings into the spring chamber, with the contaminants being removed from the air by the polymer membrane. Conversely, when the spring is compressed, as when the spring brake is released, air is exhausted from the spring chamber through the vent openings to atmosphere, simultaneously cleaning the polymer membrane. Consequently, air in the spring chamber is maintained substantially free of contaminants, thereby protecting the spring from corrosion. As a result, the useful service life of the brake actuator assembly is extended considerably.

In one aspect of the invention, a movable member is disposed within a brake actuator housing and divides the interior of the housing into a first chamber and a second chamber. The movable member is reciprocally removable therein in response to the delivery and exhaust of pressurized fluid to the first chamber. The housing itself has at least one vent passage in communication with the second chamber. An actuator rod is operably connected to the movable member and moves with it to operate a brake. A spring lies in the second chamber in a position to move the movable member when the first chamber is collapsed on exhaust of pressurized fluid. In accordance with the invention, a polymer membrane overlies the vent passage and is adapted to permit the passage of air in response to movement of the movable member, while at the same time filtering liquid in solid particles from passing therethrough into the housing.

In another embodiment, the movable member is a diaphragm, and preferably an elastomeric diaphragm as would be found in an air operated diaphragm spring brake actuator.

Preferably, the polymer membrane is hydrophobic, or oleophobic, or both. Also, it is preferable that the polymer membrane be formed of expanded polytetrafluroethylene. In a typical embodiment, the polymer membrane will have a pore size of about one micron and will be mounted on an outside surface of the housing and mounted to a filter frame housing.

In another aspect of the invention, the filter frame assembly covers the polymer membrane, which is disc-shaped, and further defines tortuous air passages from the membrane the exterior of the filter frame assembly.

In a further embodiment, the filter element is toroidal in shape and rests in an annular depression in an end wall of the housing. The filter frame assembly comprises a perforated plate secured to the end wall of the housing over the filter element, and a shield is secured over the plate with offset openings to define the toutuous air passages.

In another embodiment of the invention, the frame assembly comprises an inner frame and an outer frame with a disc-shaped polymer membrane sandwiched between the two. The inner frame has a peripheral rim flange, and the outer frame is nested within the inner frame to provide a seal between the two. Also, leaf spring flanges on the outer frame assure compression of the seal elements against deflection of the end wall of the housing by the large force compression spring as it alternately expands and compresses.

In yet another embodiment of the invention, the entire filter frame assembly is secured to the exterior of the housing by snap-fit engagement, with a nut secured to the housing and received in a hub opening in the filter frame assembly.

BRIEF DESCRIPTION OF THE DRAWING

FIG. 6 is a plan view of the filter element of FIG. 3;

FIG. 7 is a plan view of the outer frame of the filter frame assembly of FIG.3;

FIG. 8 is a cross-sectional view taken along line 8—8 of FIG. 7; and

FIG. 9 is an elevational view of the cover of the filter frame assembly of FIG. 3.

DETAILED DESCRIPTION

Figure 1:
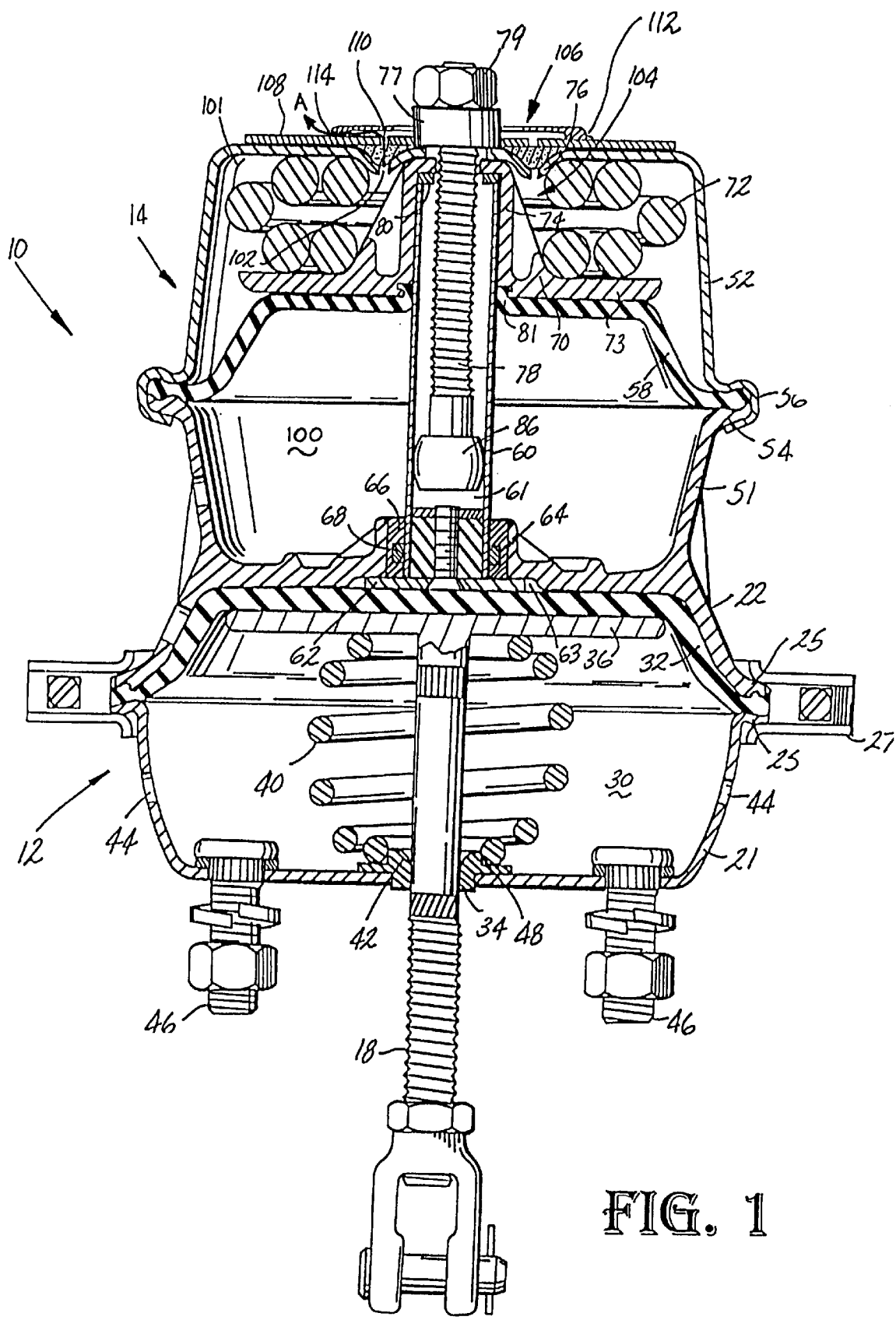
FIG. 1 is a cross-sectional view of a spring brake actuator with filtered vent openings according to the invention.

FIG. 1 shows a cross-sectional view of an air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 and is adapted to operably connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flange edge 25. The housing sections 21, 22 are clamped together at their flange edges by means of a clamp 27 to form a service brake inner chamber 30. An elastomeric diaphragm 32 is suspended within the inner chamber 30 and is compressed at the peripheral edge thereof between flange edges 25 of the housing sections 21, 22. The service brake push rod 18 extends through a central opening 34 in housing section 21 and into the service brake chamber 30 where it terminates in a pressure plate 36. A return spring 40 extends between the pressure plate 36 and the interior surface of the housing section 21. A push rod guide 42 is disposed around the central opening 34 and has a spring seat 48 which receives one end of the compression spring 40 to retain it in position around the opening 34. The spring 40 thus tends to urge the pressure plate 36 and the service brake push rod 18 to a fully retracted position shown in FIG. 1.

To operate the service brake, compressed air is introduced through an air service port in housing section 22 (not shown in the drawing) to force the diaphragm 32 and the pressure plate 36 against the force of the spring 40 to actuate the push rod 18. Opening 44 are provided in the housing section 21 to permit the rapid evacuation of air from the inner chamber 30 as the brake is actuated. Mounting studs 46 are provided to mount the brake actuating unit 10 onto a vehicle.

The spring brake 14 comprises a pair of facing cup-shaped housing sections 51, 52 joined at their edges to form an inner chamber. Typically, housing sections 22, 51 are formed of an integral cast piece. Housing section 51 is provided with an outwardly directed circumferential flange edge 54. The housing sections 51 and 52 are clamped together by means of a peripheral curved edge 56 on housing section 52 engaging edge 54 on housing section 51. An elastomeric diaphragm 58 is suspended within the inner chamber and is compressed at its peripheral edge between the edges 54, 56 of the housing sections 51, 52. The portion of the inner chamber between the diaphragm 58 and the housing section 51 forms an air chamber 100 which is filled with compressed air typically supplied through an air service port in housing section 51 (not shown in the drawing) when the emergency brake is in its normal, released position. The portion of inner chamber between the diaphragm 58 and housing section 52 defines a compression spring chamber 101, containing a large-force spring brake compression spring 72.

An actuator rod 60, aligned with the push rod 18, has a distal end extending through a central opening 64 in an end wall of housing section 51. The distal end of actuator rod 60 terminates in a reaction plate 62 disposed in an annular seat 63 in an end wall of housing section 22. The opening 64 is provided with a bearing 66 having at least one annular recess which accommodates at least one O-ring seal 68. The bearing 66 defines a bearing surface for actuator rod 60, and the O-ring 68 seals the pressure chamber in the service brake 12 from the air chamber 100 in the spring brake 14. The proximal end of the actuator rod 60 extends through a centrally disposed aperture 81 in the diaphragm 58 and terminates in a pressure plate 70 which engages the spring brake compression spring 72. The pressure plate 70 comprises a substantially flat portion 73 engaging one end of the spring 72 and a tubular portion 74 extending generally axially along the axis of the spring 72. The tubular portion 74 is press-fit onto an end portion of the actuator rod 60 such that the pressure plate 70 and the actuator rod 60 form an integral unit. An annular recess 76 in an end wall of the housing section 52 serves as a seat for the spring 72 and also provides rigidity to the end wall against the force of the spring 72.

During normal operation of the brake actuator 10, the actuator rod 60 will be in the fully retracted position, as depicted in FIG. 1, by means of compressed air which is maintained in the air chamber 100. When the compressed air is exhausted, the compression spring 72 forces the pressure plate 70 and the rod 60, integrally attached to the pressure plate, in the direction of the brake push rod 18 of the service brake 12. The force of the spring 72, when released, causes the actuator rod 60 to be extended through the central opening 64 which, in turn, causes the reaction plate 62 to apply a force to the diaphragm 32 and the pressure plate 36 of the service brake 12. This action causes the service brake push rod 18 to be actuated and the brake to be applied. When the emergency brake is to be released, compressed air is once again introduced into the air chamber 100. The force of the compressed air against the diaphragm 58 urges the pressure plate 70, the rod 60, and the spring 72 toward the retracted position depicted in FIG. 1.

The actuator rod 60 preferably is a hollow tube or rod provided with a central bore 61 to accommodate a brake release caging rod or tool 78. The distal end is closed by the reaction plate 62, but the proximal end is open, and an aperture is provided in the pressure plate 70 to permit the caging rod 78 to extend therethrough. The caging rod 78 is used to manually release the spring brake or to ensure that the compression spring 72 will remain compressed (or caged) when maintenance functions are performed on the brake assembly. The caging rod 78 preferably is a bolt or the like threaded into a fixed threaded opening, such as, for example, the threaded collar 77 affixed by welding to the end wall of housing section 52. A hex-head nut 79 is fixedly attached to the caging rod 78 to facilitate threading the bolt into and out of the chamber 14 by a common wrench or the like. The end of the caging rod 78 within the actuator rod 60 has an enlarged head or plate 86.

An inwardly directed annular shoulder 80 in the tubular section 74 provides positive engagement with the actuator rod 60 when the rod is actuated and further serves as an engagement surface for the caging rod head 86 against which the caging rod head 86 will bear when the caging rod 78 is withdrawn. Upon withdrawal, the caging rod 78 retains the compression spring 72 in its compressed or caged state. Otherwise, the caging rod 78 extends into the central bore 61 of actuator rod 60 by a sufficient distance to allow the actuator rod 60 to extend its full length of travel without engagement between the shoulder 80 and the caging rod head 86.

FIG. 1 further shows a plurality of vent openings 102 in the annular recess of the end wall of the housing section 52. Resting in the annular recess 76 over the vent openings 102 is a gas permeable filter element. Preferably, the filter element is a porous polymer membrane having hydrophobic and oleophobic properties and a pore size of about one micron. An acceptable filter element comprises a treated, expanded polytetrafluoroethylene (PTFE), available from W. L. Gore and Associates and sold under the brand name Gore-Tex®.

The filter element 104 is retained in place by a filter frame assembly 106 comprising a plate 108 which is perforated with openings 110 and secured as by welding to the housing section 52. The openings 110 in the plate 108 are covered by a shield 112, which itself has openings 114 offset from the openings 110 in the plate 108. The openings 114 can be located adjacent to the threaded collar 77, or at a peripheral edge of the shield. The offset location of the openings in the shield 112 and plate 108 define a tortuous air path identified by the arrow A extending between the air chamber 101 and the exterior atmosphere which effectively requires all of the air entering and exiting the chamber 101 to go through the filter 104, while simultaneously protecting the filter and the openings from dirt, debris, ice accumulation, paint, and the like. It will be understood that as air is drawn into the chamber 101 when the spring 72 expands, contaminants in the atmosphere will be trapped by the filter 104. Conversely, as air is expelled from the chamber 101 when the pressure plate 70 is retracted, it is forced back through the filter and will effectively clean it, expelling the contaminants into the atmosphere. Thus, the interior of the chamber 102 is maintained substantially free of contaminants, regardless of operation of the spring brake.

Figure 2:
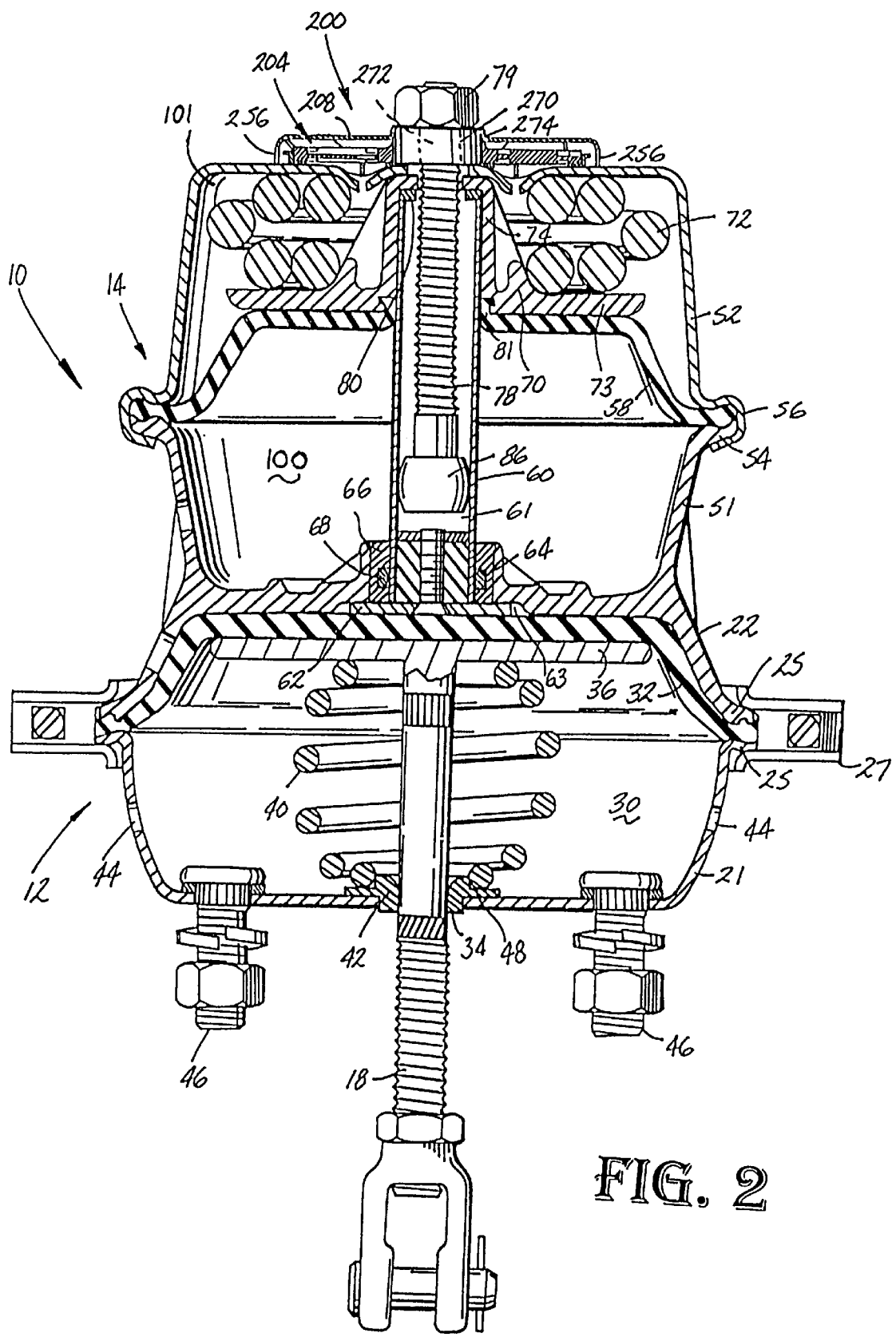
FIG. 2 is a cross-sectional view of a spring brake actuator similar to FIG. 1 with an alternative embodiment of a filter frame assembly.
Figure 3:
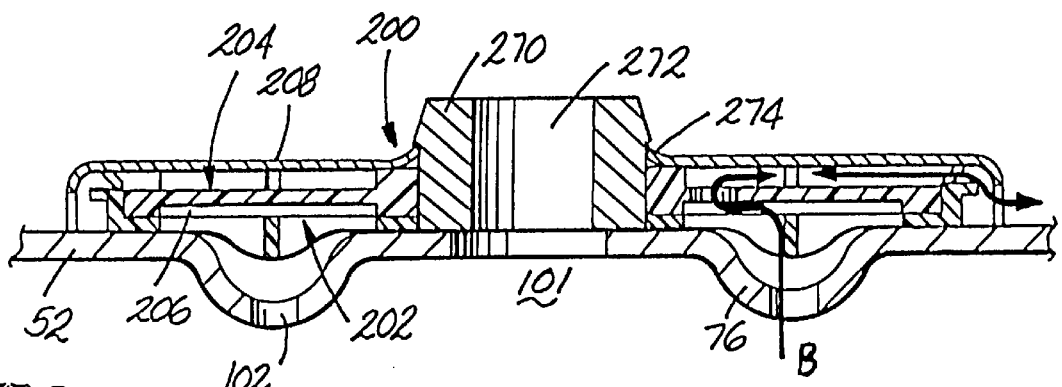
FIG. 3 is an enlarged cross-sectional view of the filter frame assembly of FIG. 2.

Turning now to FIGS. 2 and 3, a second embodiment of the spring brake actuator according to the invention is shown. A filter frame assembly 200 mounted to the end wall of housing section 52 defines a substantially more tortuous air path B for ingress to and egress from the air chamber 101. The filter frame assembly 200 comprises an inner frame 202 and an outer frame 204 with a filter element 206 retained therebetween. A cover plate 208 protects both frames and the filter element. The components of the filter frame assembly 200 are illustrated in FIGS. 4 through 9.

Figure 4:
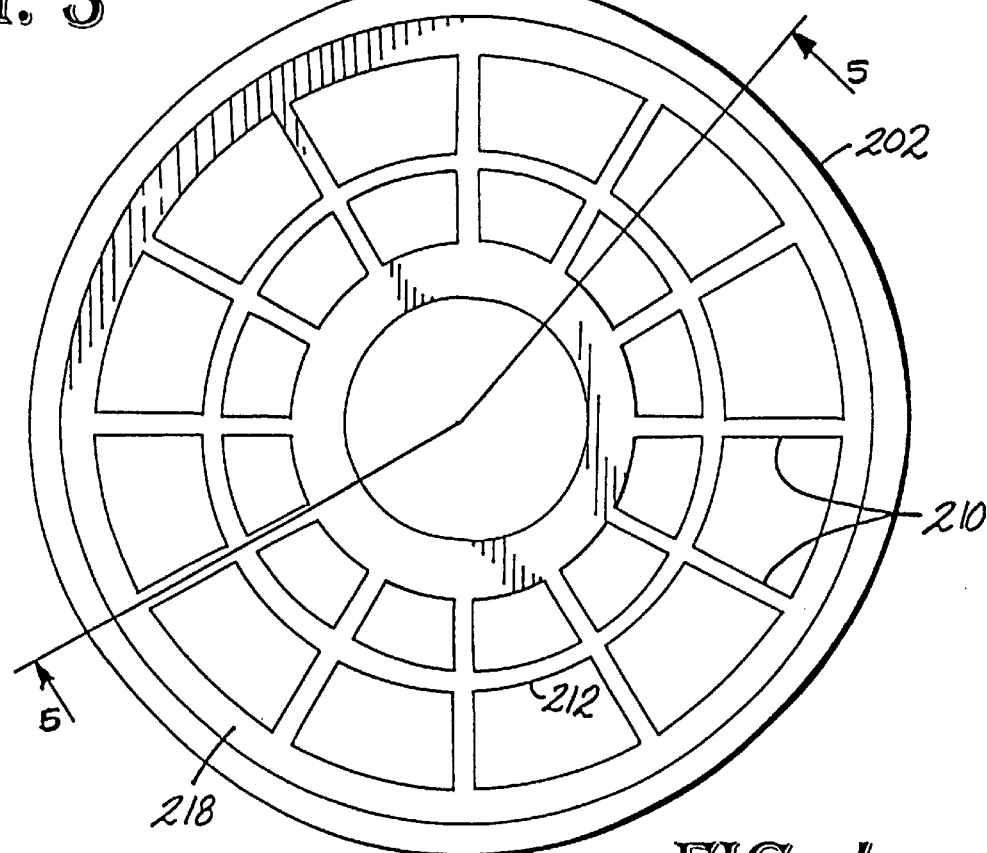
FIG. 4 is a plan view of the inner frame of the filter frame assembly of FIG. 3.
Figure 5:
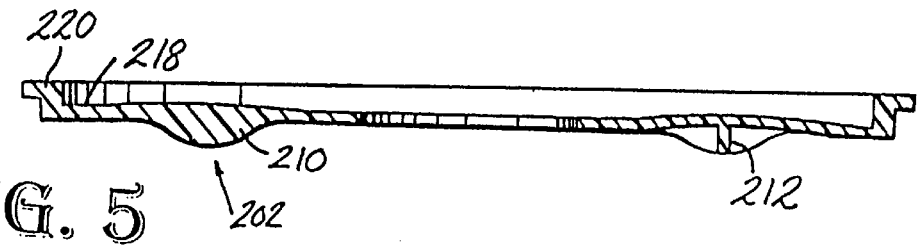
FIG. 5 is a cross-sectional view of the inner frame taken along line 5—5 of FIG. 4.

Turning now to FIGS. 4 and 5, the inner frame 202 comprises an open grid defined by radial spokes 210 and an annular rib 212. The inner ends of the radial spokes 210 are secured to an annular hub 214 surrounding a central opening 216, and are secured at outer ends thereof to an annular rim 218 which is L-shaped in cross section. A radially outwardly projecting flange 220 extends from the upstanding edge of the rim 218. Thus, the inner frame 202 is generally dish-shaped with a open grid at the bottom of the dish. Preferably, the inner frame 202 is injection molded of a relatively soft polymer such as Hytrel, typically 40 durometer on the Shore-D Scale or equivalent. Thus, the inner frame has some flexibility. Preferably, the grid is molded with a slight convex shape in cross section at the annular rib 212, thus providing a slight toroidal bulge in the grid.

Turning now to FIGS. 3 and 6, the filter element 206 is disc-shaped, being generally flat and circular. It has an outside diameter large enough so that a peripheral edge 222 thereof rests on the rim 218 within the upstanding edge of the inner frame 202. The filter element 206 also has a central aperture 224 which is sized identically to the central aperture 216 of the inner frame so that the inner edge 226 of the filter element rests on the hub 214 of the inner frame.

Turning now to FIGS. 3, 7, and 8, the outer frame 204 is a molded polymer, preferably harder than the inner frame. The outer frame 204 is typically molded polypropylene and is generally plate-like in shape and sized to nest within the dish-shaped inner frame 202. The outer frame comprises a central annular hub 230 and an outer rim 232 connected to each other by a plate-like web 234. The inner hub 230 defines a central opening 236 having the same dimensions as the openings 224 and 216 on the filter element 206 and the inner frame 202, respectively. The elements of the outer frame 204 can further be described in terms of an outer side and an inner side wherein the outer side of the outer frame faces away from the housing 52, and the inner side faces the filter element 206. The hub 230 and the rim 232 are generally thicker than the web 234, with the web 234 generally disposed roughly midway between the outer and inner sides of the hub and rim. Radial ribs 238 are provided in the web to partly define the air path B. In this embodiment, there are ten radial ribs 238 equally spaced from each other. A pair of apertures 240 extending through the web 234, straddle every other radial rib 238 adjacent to the inner hub 230. Between each aperture 240 and the outer rim 232, an annular rib 242 extends from the radial rib 238 straddled by the apertures 240 toward but spaced from the adjacent radial rib 238.

To further facilitate the flow of air through the outer frame, each radial rib 238 has notches 244 at the inner and outer ends thereof adjacent the inner hub 230 and the outer rim 232, respectively, and on both the inner and outer sides. In addition, a semicircular aperture 246 extends through the web 234 at the outer end of each radial rib 238 which is not straddled by apertures 240. The outer side of the rim 232 includes a series of rim notches 248 spaced therearound. Further, intermittently spaced about the outer rim 232 are upstanding flanges 250 which serve a function to be described hereinafter.

Turning now to FIG. 9, the cover plate 208 is a dish-shaped, stamped metal plate having a flat portion 252 and a peripheral flange 254. The peripheral flange 254 is scalloped with notches. The flat surface 252 defines a central aperture 258 surrounded by an upturned rim 260. The diameter of the central opening 258 is identical to the size of the central opening in the outer frame 204, filter element 206, and inner frame 202. The upstanding rim 260 is notched to permit some flexibility for a purpose to be described hereinafter.

Returning again to FIG. 3, a central fixed nut 270 having a central threaded aperture 272 is secured as by welding to the end wall of the outer housing section 52. The threaded internal aperture 272 accommodates the caging tool 78 in a manner similar to the threaded collar 77 described above. The weld nut 270 further has an annular shoulder 274 protruding radially from an exterior surface thereof. The filter frame assembly 200 is stacked as illustrated in FIG. 3 and retained by snap-fit engagement with the weld nut 270. The inner frame 202 rests against the outer surface of the housing section 52 with the annular rib 212 thereof resting within the recess 76 of the housing section 52. Preferably, the inner frame 202 will still be spaced from the vent openings 102 in order to avoid back pressure caused by an immediate blockage of the opening. The outer rim 218 of the inner frame 202 rests securely against the outer surface of the housing section 52. The filter element 206, on the other hand, is fixedly attached to the inner side of the outer frame 204, preferably by heat staking it to the continuous inner side surface of the inner hub 230 and the peripheral rim 232. The inner side of the outer frame 204, carrying the filter element 206, is nested within the inner frame 202 so that the filter element 206 bears against the open grid. Finally, the cover plate 208 is placed over the outer frame and around the weld nut 270 until the upstanding rim 260 thereof is snap-fit and retained beneath the shoulder 274 of the weld nut. The leaf spring flanges 250 of the outer frame thus bear against an inner surface of the flat portion 252 of the cover plate to compress the outer rims 218, 232 and thus ensure a seal between the inner side of the rim 232 and the peripheral rim 218 of the inner frame as well as to ensure a seal between the peripheral rim 218 of the inner frame and the housing section 52. This seal is especially important since the end wall of the housing section 52 tends to deflect when the spring 72 is compressed. The result is that air passing through the frame filter assembly 200 is compelled to follow a tortuous path through vent opening 102, the open grid of the inner frame 202, the pores of the filter element 206, the apertures 240, 246 of the outer frame 204, around the ribs 238, 242 on the outer side of the outer frame 204, through the notches 248 in the outer rim 232 of the frame 204, and through the scalloped notches 256 of the cover plate 208. This tortuous pathway ensures that dirt, debris, ice, salt, paint, and the like will not clog the filter or the vent openings.

The invention encompasses other variations and modifications not illustrated in the drawings, but clearly evident to one skilled in the art. For example, the filter element and the filter frame assembly can be configured to fit the side of the spring chamber housing and are not limited to mounting solely on an end wall. As another example, the cover plate is not limited to snap-fit engagement with the central weld nut. Attachment can be made just as effectively by providing an internal thread on a center boss to receive the caging bolt and threading the boss into the weld nut; or providing snap-fit engagement directly with the housing wall; or providing a spring clip attachment to the housing. Yet further, the filter element can be entirely separated from the housing and in communication with a single vent opening or multiple vent openings by one or more conduits, as the case may be. In this manner, the filter element can be positioned in a protected area of the vehicle chassis.

It will be understood that other variations and modifications of the foregoing embodiments may be devised by those skilled in the art without departing from the scope of the invention as defined by the appended claims.

We claim:

1. In a brake actuator for a vehicle comprising:
   an enclosed housing,
   a diaphragm disposed within the housing and dividing the interior thereof into a first chamber and a second chamber and reciprocally movable therein in response to the delivery and exhaust of pressurized fluid to and from the first chamber, respectively, the housing having at least one vent passage in communication with the second chamber,
   a gas permeable filter element in fluid communication with the at least one vent passage to filter solid and liquid particles from air passing through the at least one vent passage,
   an actuator rod in the first chamber and moveable with the diaphragm for operation of a brake, and
   a spring disposed in the second chamber in a position to urge the diaphragm to a first position wherein the first chamber is collapsed upon exhaust of pressurized fluid from the first chamber, the improvement wherein:
      the gas-permeable filter element is a polymer membrane which is adapted to permit the passage of air therethrough in response to movement of the diaphragm while at the same time filtering liquid and solid particles from passing therethrough into the housing.

2. A brake actuator according to claim 1 wherein the polymer membrane is hydrophobic.

3. A brake actuator according to claim 1 wherein the polymer membrane is oleophobic.

4. A brake actuator according to claim 1 wherein the housing has an end wall with an annular recess, the at least one vent opening is in the annular recess, and the filter element is generally toroidal in shape and rests in the annular recess.

5. A brake actuator according to claim 1 wherein the filter element comprises expanded polytetrafluoroethylene.

6. A brake actuator according to claim 1 and the filter element is disposed adjacent the at least one vent opening, and further comprising a filter frame assembly covering the filter element wherein the filter frame assembly defines tortuous air passages from the filter element to the exterior of the housing.

7. A brake actuator according to claim 6 wherein the filter frame comprises a perforated plate disposed over the filter element, and a shield with peripheral notches disposed over the perforated plate.

8. A brake actuator according to claim 6 wherein the filter frame assembly comprises an inner frame and an outer frame, and the filter element is disposed between the inner and outer frames.

9. A brake actuator according to claim 8 wherein the inner frame comprises an open grid and an upstanding peripheral rim.

10. A brake actuator according to claim 8 wherein the filter element is disc-shaped.

11. A brake actuator according to claim 8 wherein the outer frame has an annular hub and an annular rim with a plate-like web extending between them, the web having a plurality of apertures extending therethrough.

12. A brake actuator according to claim 8 wherein the filter element is secured to the outer frame and sealed at the perimeter thereof, the outer frame is disposed against the inner frame and sealed at the perimeter thereof, and the inner frame is disposed against the housing and sealed at the perimeter thereof.

13. A brake actuator according to claim 8 and further comprising a cover plate covering the inner and outer frames and the filter element, wherein the cover plate has a peripheral flange with a scalloped edge.

14. A brake actuator according to claim 13 wherein each of the inner frame, the filter element, the outer frame, and the cover plate have a central aperture of the same diameter, and are disposed over a nut fixedly secured to the housing.

15. A brake actuator according to claim 14 wherein the nut has a radially outwardly extending shoulder and the cover plate has a flexible upstanding rim, and the rim is in snap-fit engagement with the shoulder.

16. A brake actuator according to claim 13 and further comprising a spring between the cover plate and the outer frame to maintain the outer frame, the filter element, and the inner frame under compression.

17. A brake actuator according to claim 16 wherein the spring is a leaf spring.

18. A brake actuator according to claim 17 wherein the leaf spring comprises angled flanges on the outer frame and integral therewith.

19. A brake actuator according to claim 8 wherein the inner frame is formed of a molded polymer and is softer than the outer frame.

20. A brake actuator according to claim 8 wherein the outer frame is formed of polypropylene.

21. A brake actuator according to claim 8 wherein the filter frame assembly is secured to the housing by snap-fit engagement.

22. A brake actuator according to claim 1 wherein the polymer membrane has a pore size of about 1 micron.

23. A brake actuator according to claim 1 wherein the polymer membrane is mounted on an outside surface of the housing.

24. A brake actuator according to claim 1 wherein the housing is sealed except for the at least one vent passage and the polymer membrane covers the at least one vent passage, whereby the gas permeable filter element will filter solid and liquid particles from air moving into the second chamber and thereby maintain the second chamber substantially free of contaminants as the movable member is urged toward the first position.

25. A brake actuator according to claim 1 and further comprising a filter frame assembly mounted to an external surface of the housing and the filter element is mounted in the filter frame housing.

26. A brake actuator according to claim 25 wherein the filter frame assembly has an external opening positioned to require the air to pass through a tortuous path from the external opening through the filter element.

27. In a spring brake actuator for a vehicle comprising:
an enclosed housing defining a spring chamber,
an elastomeric diaphragm suspended within the spring chamber and dividing the interior thereof into a first chamber and a second chamber, a moveable member adjacent to the diaphragm in the second chamber and reciprocally movable therein in response to the delivery and exhaust of pressurized fluid to and from the first chamber, respectively,
an actuator rod positioned in the first chamber, operably connected to the movable member and movable therewith for operation of a brake, and
a spring disposed in the second chamber in a position to urge the movable member to a first position wherein the first chamber is collapsed upon exhaust of pressurized fluid from the first chamber,
the housing having at least one vent passage in the second chamber and the second chamber being sealed except for the at least one vent passage, the improvement comprising:
a gas permeable filter element covering the at least one vent massage and which is adapted to permit the passage of air therethrough in response to the movement of the diaphragm while at the same time filtering liquid and solid particles from passing therethrough into the spring chamber,
wherein the gas permeable filter element is a polymer membrane.

28. A brake actuator according to claim 27 wherein the filter element is hydrophobic.

29. A brake actuator according to claim 28 wherein the polymer membrane has a pore size of about 1 micron.

30. A brake actuator according to claim 28 wherein the polymer membrane is mounted on an outside surface of the housing.

31. A brake actuator according to claim 28 and further comprising a filter frame assembly mounted to an external surface of the housing and the filter element is mounted in the filter frame housing.

32. A brake actuator according to claim 31 wherein the filter frame assembly has an external opening positioned to require the air to pass through a tortuous path from the external opening through the filter element.

33. A brake actuator according to claim 27 wherein the filter element is oleophobic.

34. A brake actuator according to claim 27 wherein the housing has an end wall with an annular recess, the vent openings are in the annular recess, and the filter element is generally toroidal in shape and rests in the annular recess.

35. A brake actuator according to claim 27 wherein the filter element comprises expanded polytetrafluoroethylene.

36. In a brake actuator for a vehicle comprising:

an enclosed housing;

a movable member disposed within the housing and dividing the interior thereof into a first chamber and a second chamber and reciprocally movable therein in response to the delivery and exhaust of pressurized fluid to and from the first chamber, respectively, the housing having at least one vent passage in communication with the second chamber;

a gas permeable filter element in fluid communication with the at least one vent passage to filter solid and liquid particles from air passing through the at least one vent passage, an actuator rod operably connected to the movable member and movable therewith for operation of a brake; and a spring disposed in the second chamber in a position to urge the movable member to a first position wherein the first chamber is collapsed upon exhaust of pressurized fluid from the first chamber, the improvement wherein:

the gas-permeable filter element is a polymer membrane which overlies the vent passage and is adapted to permit the passage of air therethrough in response to movement of the movable manner while at the same time filtering liquid and solid particles from passing therethrough into the housing.

37. A brake actuator according to claim 36 wherein the polymer membrane is mounted to an external surface of the housing.

* * * * *

UNITED STATES PATENT AND TRADEMARK OFFICE
CERTIFICATE OF CORRECTION

PATENT NO.: 6,029,447

DATED: February 29, 2000

INVENTOR(S): Stojic et al.

It is certified that error appears in the above-identified patent and that said Letters Patent is hereby corrected as shown below:

Claim 6, col. 9, line 3, "and" should read --wherein--;

Claim 27, col. 10, line 37, "vent massage" should read --vent passage--;

Claim 36, col. 12, line 8, "movable manner" should read --movable member--.

Signed and Sealed this

Twenty-sixth Day of December, 2000

*Attest:*

Q. TODD DICKINSON

*Attesting Officer*      *Director of Patents and Trademarks*